A. W. BURKE
Feb. 3, 1931. WASHING MACHINE Re. 17,945
Original Filed Dec. 21, 1921
Fig. 1,
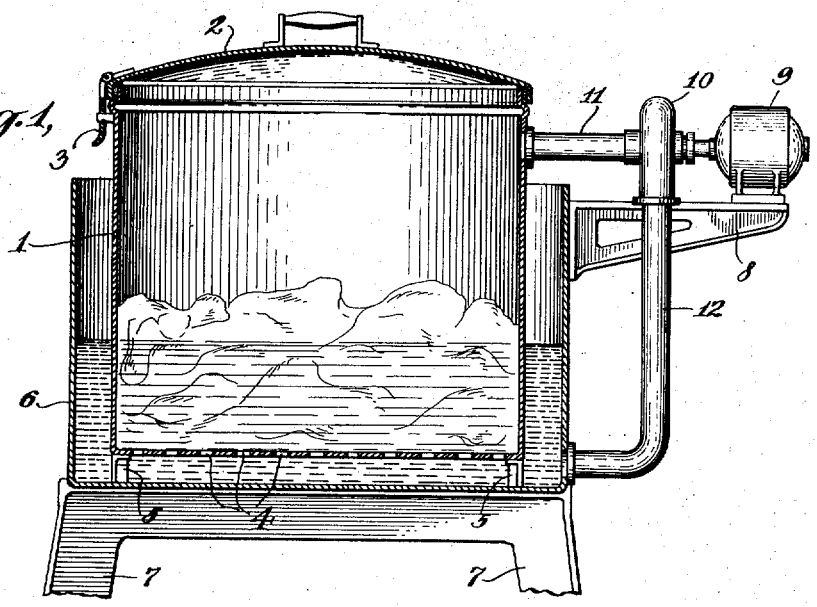
Fig. 2,
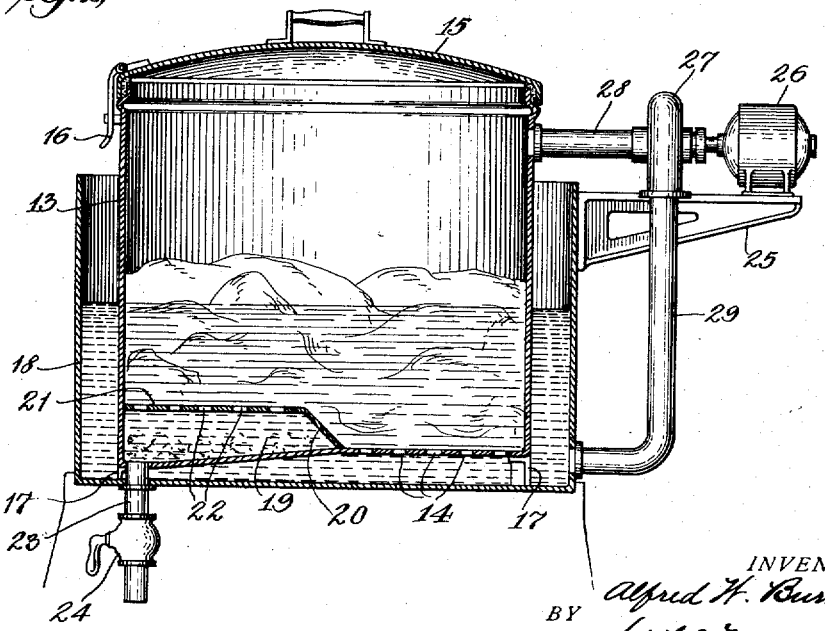
INVENTOR
Alfred H. Burke.
BY Riddle & Marquson.
ATTORNEYS Reissued Feb. 3, 1931 Re. 17,945

UNITED STATES PATENT OFFICE

ALFRED W. BURKE, OF PELHAM MANOR, NEW YORK, ASSIGNOR, BY MESNE ASSIGNMENTS, TO THE BLACK AND DECKER MANUFACTURING COMPANY, OF TOWSON, MARYLAND, A CORPORATION OF MARYLAND

WASHING MACHINE

Original No. 1,613,787, dated January 11, 1927, Serial No. 523,820, filed December 21, 1921. Application for reissue filed March 29, 1928. Serial No. 265,765.

My invention relates to an improvement in washing machines and an object thereof is to improve and simplify the construction of washing machines as now constructed and to increase their efficiency. Another object is to provide an improved method of operation of the washing machine.

In general, my improved device comprises an apparatus wherein a vacuum or reduced pressure is employed to agitate the clothes or other articles to be washed.

In the accompanying drawings,—

Fig. 1 shows an embodiment of my improved device in part sectional elevation, and Fig. 2 is a part sectional elevation of a modified form thereof.

Referring to the drawings in detail,—1 designates what I shall hereinafter refer to as a main tank which is provided with a cover 2 adapted to be secured thereto by any suitable means such as quick acting clamps 3 for example. The cover is substantially an airtight fit. The bottom of the tank is provided with perforations as indicated at 4 for a purpose to be better pointed out hereafter. The tank 1 is mounted on legs 5 within an auxiliary tank 6 and in spaced relation thereto, the auxiliary tank being supported as upon legs 7 or in any other suitable manner. Mounted adjacent the main tank, in the present instance upon a bracket 8 secured to the side of the auxiliary tank 6 is a motor 9 for driving a vacuum fan 10. Connected to the intake side of this fan is a pipe 11 passing into or through the wall of the main tank 1 so as to be in communication with the interior thereof. The vacuum apparatus is provided with a return side 12 here shown as a pipe, this pipe communicating with the auxiliary tank 6 at some point below the level of the device 10. For convenience I have shown the return pipe 12 entering the auxiliary tank 6 at a point adjacent the bottom thereof.

In operation the water is placed in the tank 6 and flows through the perforations 4 in the bottom of the tank 1 until the desired level is reached. The clothes or other articles to be washed may then be placed in the main tank and the cover 2 clamped down. The motor 9 may now be operated to drive the vacuum fan to create a vacuum within the tank 1. This reduction of pressure within the main tank causes a rise in the level of the water in the tank 1, water flowing from the tank 6 until the level of the water in the latter is adjacent the bottom of the main tank. When the water in the auxiliary tank reaches this level the water seal is broken and air is drawn through the tank 6 and through the perforations 4 to agitate the water in the work tank 1. I preferably apply the vacuum intermittently so that at certain intervals the body of water in the main tank will rise and fall due to the intermittent application of the vacuum, this surging effecting further agitation of the articles being washed. The combined action of the air passing through and around the articles being washed and the surging of the water in the main tank effect the desired cleansing. Any water or suds which may be drawn into the device 10 will be returned to the auxiliary tank 6 by way of the return pipe 12. In this way after the machine is filled to the desired degree with water no further attention need be paid to it until the washing operation is completed.

In the modification shown in Fig. 2 I provide a main tank 13, the bottom of which, to one side of the center thereof is perforated as indicated at 14. This tank likewise is provided with a cover 15 having a substantially airtight fit with the tank and held in place by quick acting clamps 16. This tank is mounted upon legs 17 within an auxiliary tank 18 similar to the tank 6 of Fig. 1. The interior of the main tank 13 is provided with a trap 19 for sediment, this trap comprising a baffle 20 at the bottom of the tank to one side of the perforations 14, the upper edge of this baffle being spaced a short distance from the bottom of the tank. Extending from the upper edge of the baffle 20 to the side of the tank 13 is a plate 21 perforated as indicated at 22. The plate 21, baffle 20 and a portion of the bottom of the tank 13 constitute the walls of a compartment or chamber which I have referred to above as a trap for sediment and which I have designated 19. Leading from this trap is a pipe 23 conveniently controlled by a valve 24 by which the sediment in the trap may be withdrawn.

Mounted upon one wall of the tank 18 is a bracket 25 supporting a motor 26 provided for the purpose of driving a vacuum fan 27. The intake side of this fan is connected to the interior of the tank 13 by a pipe 28 while the return side is connected to the tank 18 by return pipe 29. The operation of this device is very similar to that of the device of Fig. 1. As the motor 26 is put in operation after the tank 18 has been filled to the desired degree with water a vacuum will be created on the interior of the tank 13 to cause an agitation of the water and clothes or other articles therein. First water and then air will be drawn through the perforations 14. As these perforations are at one side of the tank 13 the air being drawn through the perforations will tend to upset the articles being washed, thereby insuring a very thorough agitation of these articles. The sediment from the clothes or other articles being washed settles in the trap 19 passing into this trap through the perforations 22. In this arrangement of course the suds and water which are drawn into the fan 27 are returned to the tank 18 by way of the return pipe 29 so that it is unnecessary to refill the tank 18 until the washing operation is completed.

It will be seen from the foregoing that I have provided a machine for washing purposes wherein a reduction in pressure of partial vacuum within the tank containing the articles to be washed is relied upon for effecting the desired agitation of the articles being washed and that for this reason the wear and tear on these articles is very much reduced as compared with the mechanical devices now employed.

While I have shown a specific embodiment of my invention it is to be understood, however, that changes may be made in the details thereof within the purview of my invention.

I claim:

1. In combination, an auxiliary tank, a main tank disposed therein and in spaced relation thereto, one wall of said main tank being perforated, a bracket carried by the auxiliary tank, a motor supported on said bracket, a vacuum fan driven by said motor, the intake side of said fan being in communication with the interior of said main tank and the return side of said fan being in communication with the interior of the auxiliary tank.

2. In combination, a closed tank provided with a perforated bottom, an open auxiliary tank within which the main tank is mounted in spaced relation thereto, a motor driven vacuum fan supported by one of said tanks and means for establishing communication between the intake side of said fan and the interior of said main tank and between the return side of said fan and the interior of said auxiliary tank.

3. In combination, an open auxiliary tank containing a liquid, a main tank within said auxiliary tank and in spaced relation thereto, the bottom of said main tank being provided with perforations, a bracket carried by said auxiliary tank, a motor supported on said bracket, a vacuum fan connected to said motor, a pipe leading from said fan to the interior of said auxiliary tank whereby air may be drawn through the liquid in the auxiliary tank and through the perforations in the main tank and through the liquid in said main tank, any liquid passing to said fan being returned to said auxiliary tank.

4. In a washing machine, a work receptacle, an air suction fan connected to said work receptacle above the water level therein to draw air only therefrom, an auxiliary receptacle in communication with the bottom of the work receptacle and having a capacity such that the depth of the water in the work receptacle will be substantially increased when the water in the auxiliary receptacle is transferred to the work receptacle, a passageway connecting said auxiliary receptacle to a source of air whereby upon operation of the suction fan to draw air from the work receptacle, the depth of water will first be substantially increased and then air will be drawn through the water.

5. In a washing machine, a work receptacle, an auxiliary receptacle adapted to contain water in communication with the bottom of the work receptacle, a uni-directional air suction fan connected at its suction side to said work receptacle above the water level to draw air from said work receptacle and a conduit connecting the delivery side of said fan to said auxiliary receptacle to deliver air thereto, said conduit being of substantially smaller cross sectional area than said auxiliary receptacle.

6. In a washing machine, an inner work receptacle, and outer receptacle open to atmospheric air substantially surrounding said work receptacle and adapted to contain water, a connecting port between said receptacles to admit first water from the outer receptacle to the work receptacle and when the water falls to a predetermined level in the outer receptacle to admit air to said work receptacle to agitate the water, and a uni-directional suction fan having a conduit connected to said work receptacle to create suction therein.

7. In a washing machine, an inner work receptacle having a closed top and a perforate bottom, an auxiliary receptacle substantially surrounding said work receptacle and adapted to contain water in communication with the perforate bottom and freely open to atmospheric air to permit a surging of water between said receptacles and to permit water and then air to be drawn from said outer receptacle to said inner receptacle and an exhaust fan connected above the water level to exhaust air from said inner receptacle to create a vacuum therein and to draw through the perforate bottom first a predetermined quantity of water and then air to agitate the water.

8. In a washing machine a work receptacle having a closed top and a bottom having perforations over substantially its entire area, an auxiliary receptacle in communication with said perforate bottom, and an exhaust fan connected to exhaust air from said closed receptacle to create a vacuum therein and to draw through the perforate bottom first a quantity of water and then air to agitate the water.

9. In a washing machine a work receptacle, an auxiliary receptacle surrounding said work receptacle and adapted to contain water, passages maintaining communication between said work receptacle at the bottom thereof and said auxiliary receptacle, and a suction fan the inlet conduit of which communicates directly with the work receptacle above the water level therein to create suction therein to first draw only water through the connecting passages from the auxiliary receptacle to the work receptacle and then to draw in air from the outside atmosphere through the same passages to agitate the water.

10. In a washing machine, an inner work receptacle, an outer receptacle adapted to contain water and substantially surrounding said work receptacle in communication with the work receptacle through the bottom of the latter and with a source of air, and means communicating directly with the work receptacle to create a vacuum intermittently therein to effect a surging of the water and to draw said air through the water, said means comprising a motor and a suction fan driven thereby.

11. In a washing machine an inner work receptacle, an outer receptacle substantially surrounding said inner receptacle and adapted to contain water in communication with the work receptacle through the bottom of the latter and with a source of air, a motor, a suction fan actuated thereby and communicating directly with the work receptacle to exhaust air therefrom, to cause a vacuum intermittently therein, to cause a surging of the water to and from the work receptacle and to draw air from said source into the work receptacle to agitate the water.

12. In a washing machine, a work receptacle, an air suction fan connected to said work receptacle above the water level therein, to draw air only therefrom, an auxiliary receptacle comparable in volume with said work receptacle and adapted to contain water, a passageway connecting said auxiliary receptacle with a source of air, said auxiliary receptacle being in communication with the bottom of the work receptacle, thereby to admit a substantial volume of water to the work receptacle under the action of the suction fan, thus materially raising the water level therein, and then to admit air from said source.

ALFRED W. BURKE.